US010085060B2

(12) United States Patent
PangZe (10) Patent No.: US 10,085,060 B2
(45) Date of Patent: Sep. 25, 2018

(54) INTEGRATED SOLUTION METHOD AND SYSTEM FOR MONITORING CINEMA CONTENT AND CONDUCTING MOVIE-VIEWING STATISTICS

(71) Applicant: FieldView International, LLC, Acton, MA (US)

(72) Inventor: Mufeng PangZe, Beijing (CN)

(73) Assignee: FieldView International, LLC, Acton, MA (US)

( * ) Notice: Subject to any disclaimer, the term of this patent is extended or adjusted under 35 U.S.C. 154(b) by 76 days.

(21) Appl. No.: 15/260,443

(22) Filed: Sep. 9, 2016

(65) Prior Publication Data

US 2017/0078749 A1 Mar. 16, 2017

(30) Foreign Application Priority Data

Sep. 10, 2015 (CN) .......................... 2015 1 0613092

(51) Int. Cl.
*H04N 21/214* (2011.01)
*H04N 21/422* (2011.01)
(Continued)

(52) U.S. Cl.
CPC . *H04N 21/44218* (2013.01); *G06F 17/30817* (2013.01); *H04N 9/31* (2013.01); *H04N 21/214* (2013.01); *H04N 21/23418* (2013.01); *H04N 21/41415* (2013.01); *H04N 21/4223* (2013.01); *H04N 21/42201* (2013.01); *H04N 21/44204* (2013.01); *H04N 21/44231* (2013.01); *H04N 21/4532* (2013.01); *H04N 21/812* (2013.01); *G06F 11/3089* (2013.01)

(58) Field of Classification Search
None
See application file for complete search history.

(56) References Cited

U.S. PATENT DOCUMENTS

2009/0019472 A1* 1/2009 Cleland .................. G06Q 30/02
725/34
2009/0043725 A1* 2/2009 Gutta ..................... H04N 7/163
706/54

(Continued)

*Primary Examiner* — Ricky Chin
(74) *Attorney, Agent, or Firm* — Blueshift IP, LLC; Robert Plotkin (57) ABSTRACT

A system monitors cinema playing content and generates movie-viewing statistics. The method includes, among other steps: acquiring screen brightness and projection ambient brightness or a video; comparing the acquired screen brightness and the projection ambient brightness or discriminating the video; activating, after it is determined that a film begins to be projected, an acquisition and recognition device of the terminal equipment to acquire the played audio and video content and acquire an auditorium infrared picture during projection; comparing, by the acquisition and recognition device, the acquired audio and video content with a monitoring database to obtain the projected content, recognizing, by the acquisition and recognition device, human bodies in the acquired auditorium infrared picture during projection to count the number of audiences; and associating or combining, by the acquisition and recognition device, the projected content obtained through comparison with the counted number of audiences.

22 Claims, 1 Drawing Sheet

(51) Int. Cl.

| | | |
|---|---|---|
| *H04N 21/442* | (2011.01) | |
| *H04N 21/45* | (2011.01) | |
| *H04N 9/31* | (2006.01) | |
| *H04N 21/4223* | (2011.01) | |
| *G06F 17/30* | (2006.01) | |
| *H04N 21/234* | (2011.01) | |
| *H04N 21/414* | (2011.01) | |
| *H04N 21/81* | (2011.01) | |
| *G06F 11/30* | (2006.01) | |

(56) References Cited

U.S. PATENT DOCUMENTS

| | | | | |
|---|---|---|---|---|
| 2009/0282430 | A1* | 11/2009 | Gupta | G02B 6/29374 725/20 |
| 2011/0004624 | A1* | 1/2011 | Bansal | G06F 17/30864 707/776 |
| 2013/0097625 | A1* | 4/2013 | Thorwirth | G06F 17/30038 725/25 |
| 2013/0305273 | A1* | 11/2013 | Hadfield | H04N 21/44204 725/14 |
| 2014/0026158 | A1* | 1/2014 | Rowe | H04H 60/31 725/18 |
| 2014/0040934 | A1* | 2/2014 | Zelesko | H04N 21/4405 725/20 |
| 2015/0195517 | A1* | 7/2015 | Brown | H04N 5/74 348/189 |
| 2015/0271540 | A1* | 9/2015 | Melby | H04N 21/2668 725/34 |
| 2016/0112768 | A1* | 4/2016 | Kim | H04N 21/25825 725/19 |

* cited by examiner

INTEGRATED SOLUTION METHOD AND SYSTEM FOR MONITORING CINEMA CONTENT AND CONDUCTING MOVIE-VIEWING STATISTICS

TECHNICAL FIELD

The present invention relates to a cinema monitoring method, and in particular, to an integrated solution method and system for monitoring cinema content and conducting movie-watching statistics.

BACKGROUND ART

At present, cinema content monitoring still requires manual acquisition, which is affected by many factors such as high costs, sparse sampling, and inaccurate data, and can only function as temporary sampling inspection. Cinema box office statistics are generally rough statistical numbers estimated by professionals according to experience. The number of movie viewers is obtained by collecting statistics of a ticketing system, and there exists phenomena such as buying a ticket but not watching the film and "box office stealing", which cause data to be inaccurate. Statistics about the cinema content monitoring, box office, and the number of movie viewers need to be obtained in different approaches. Moreover, there is no historical movie viewing basis, and thus no valid evidence can be provided for box office disclosure, and there is no effective perfect data support.

To implement an integrated solution method and system for monitoring cinema content and conducting movie-viewing statistics, the following problems need to be solved: firstly, the capability of a computer system to accurately judge a working state of a screen, where the difficulty lies in distinguishing a light state of the screen and a light state when stage lights are turned on; secondly, the capability of discriminating, by means of image recognition, the moment when an icon image of the "License for Public Projection of Films" appears, where the difficulty lies in that light of images shot from the screen is severely distorted, which makes high requirements on recognition algorithms; thirdly, accurate recognition of human body characteristic values in a completely dark environment in the cinema; fourthly, recognition of audio characteristic values of the movie being projected in a noisy environment in the cinema; fifthly, acquisition of movie advertisement data; sixthly, movie cumulative statistics collection; seventhly, collection of statistics on attendance during movie-viewing time; and eighthly, collection of statistics on the real-time number of movie viewers.

Currently, there is no suitable photographing and monitoring product on the market that can meet the requirements.

SUMMARY OF THE INVENTION

An objective of the present invention is to provide an integrated solution method for monitoring cinema content and conducting movie-viewing statistics, which has low costs in monitoring and statistics as well as high reliability, so as to overcome the above disadvantages of the prior art. The present invention further relates to a system for implementing the method.

To achieve the above objective, the integrated solution method for monitoring cinema content and conducting movie-viewing statistics of the present invention includes: acquiring, by use of a servomechanism of terminal equipment configured in a cinema, screen brightness and projection ambient brightness or a video projected at the beginning, comparing the acquired screen brightness and the projection ambient brightness or discriminating the video projected at the beginning, and activating, after it is determined that a film begins to be projected, an acquisition and recognition device of the terminal equipment to acquire the played audio and video content and acquire an auditorium infrared picture during projection; comparing, by the acquisition and recognition device, the acquired audio and video content with a monitoring database to obtain the projected content, recognizing, by the acquisition and recognition device, human bodies in the acquired auditorium infrared picture during projection to count the number of audiences, and associating or combining, by the acquisition and recognition device, the projected content obtained through comparison with the counted number of audiences; uploading, by a communications device of the terminal equipment, the projected content obtained through comparison and the counted number of audiences to a monitoring platform; and monitoring, by the monitoring platform, a working state of the terminal equipment in real time via the communications device. The method of the present invention desirably solves the problems with data statistics such as the cinema content monitoring, box office, and the real-time number of movie viewers, thus providing accurate and valid evidence for "box office stealing/missing", avoiding sparse sampling as well as missing and errors in statistics of manual monitoring, reducing costs of data statistics, and improving the data accuracy. That is, the method has the advantages of low costs in monitoring and statistics as well as high reliability.

Optionally, the acquisition and recognition device associates or combines the projected content obtained through comparison and the counted number of audiences with the acquired audio and video content sample and the acquired auditorium infrared picture sample during projection; the communications device of the terminal equipment uploads, to the monitoring platform directly or to the monitoring platform via a cinema monitoring central control, the projected content obtained through comparison and the counted number of audiences, or the projected content obtained through comparison and the counted number of audiences as well as the acquired audio and video content sample and the acquired auditorium infrared picture sample during projection; and the monitoring platform monitors the working state of the terminal equipment in real time via the communications device and the cinema monitoring central control.

Optionally, the servomechanism acquires, by using a brightness sensor, the screen brightness and brightness of a side screen material surface illuminated by projection ambient light, compares the brightness, and upon detecting that the screen brightness is significantly higher than the brightness of the screen material surface continuously or intermittently, activates the acquisition and recognition device to acquire the audio and video content and the auditorium infrared picture; or the servomechanism recognizes animation in the acquired video projected at the beginning, and upon confirming that varying images are being projected, activates the acquisition and recognition device to acquire the audio and video content and the auditorium infrared picture.

Optionally, the acquisition and recognition device stops the acquisition upon acquiring and recognizing an image or text in a "License for Public Projection of Films" of the projected film, and packages a recognition and statistical result or the acquired samples and the recognition and statistical result; the communications device of the terminal equipment uploads the package to the monitoring platform; and the monitoring platform monitors the working state of the terminal equipment in real time via the communications device; or the acquisition and recognition device stops the acquisition upon acquiring and recognizing an image or text in a "License for Public Projection of Films" of the projected film, discriminates the acquired audio and video content and the auditorium infrared picture, to recognize the projected film and count the number of audiences, or recognize the projected film and a pre-roll advertisement and count the number of audiences at the start of the film; the servomechanism continuously acquires the projected videos after the film begins to be projected, and upon recognizing end credits of the film, reactivates the acquisition and recognition device to acquire the auditorium infrared picture and recognize and count the number of audiences at the end of the film, and packages the two successive recognition and statistical results or the two successive acquired samples and recognition and statistical results; the communications device of the terminal equipment uploads the package to the monitoring platform; and the monitoring platform monitors the working state of the terminal equipment in real time via the communications device.

By comparing the numbers of movie viewers in periods at the start of the film and at the end of the film, the movie viewing atmosphere or the degree of how much the audiences like the film can be obtained. That is, if there is good atmosphere among the audiences or the audiences like the film very much, the audiences do not leave the cinema immediately when the end credits of the film appear, and the number of audiences at the end of the film is not significantly smaller than the number of audiences at the start of the film. Certainly, if the number of audiences at a time point in the middle of film projection is further acquired, and the numbers of audiences at the start of the film, in the middle of the film, and at the end of the film are further compared and analyzed, in-depth movie viewing atmosphere or an in-depth degree of how much the audiences like the film can be further obtained.

Optionally, the acquisition and recognition device acquires the projected film video or the pre-roll advertisement video and the film video, or acquires the projected film video or the pre-roll advertisement video, as well as the film video and cinema live audio by using a white light camera aimed at the screen; and acquires the auditorium body infrared picture by using an infrared camera aimed at the auditorium; and the acquisition and recognition device compares and discriminates the acquired videos with the monitoring database, to recognize the projected film or the projected film and the pre-roll advertisement; the acquisition and recognition device filters the acquired audio and analyzes a voice print of the audio, and compares the voice print with a voice print of a standard movie-viewing atmosphere in a cinema, to recognize a cinema ambient sound based movie-viewing atmosphere result; and the acquisition and recognition device recognizes human bodies in the acquired audience body infrared picture and statistically obtain a result of the number of audiences.

A system for implementing the method of the present invention, wherein a servomechanism of terminal equipment configured in a cinema acquires screen brightness and projection ambient brightness or a video projected at the beginning, compares the acquired screen brightness and the projection ambient brightness or discriminates the video projected at the beginning, and activates, after it is determined that a film begins to be projected, an acquisition and recognition device of the terminal equipment to acquire the played audio and video content and acquire an auditorium infrared picture during projection; the acquisition and recognition device compares the acquired audio and video content with a monitoring database to obtain the projected content, and the acquisition and recognition device recognizes human bodies in the acquired auditorium infrared picture during projection to count the number of audiences, and associates or combines the projected content obtained through comparison with the counted number of audiences; then a communications device of the terminal equipment uploads the projected content obtained through comparison and the counted number of audiences to a monitoring platform; and the monitoring platform monitors a working state of the terminal equipment in real time via the communications device. The system of the present invention desirably solves the problems with data statistics such as the cinema content monitoring, box office, and the real-time number of movie viewers, thus providing accurate and valid evidence for "box office stealing/missing", avoiding sparse sampling as well as missing and errors in statistics of manual monitoring, reducing costs of data statistics, and improving the data accuracy. That is, the system has the advantages of low costs in monitoring and statistics as well as high reliability.

Optionally, the acquisition and recognition device associates or combines the projected content obtained through comparison and the counted number of audiences with the acquired audio and video content sample and the acquired auditorium infrared picture sample during projection; the communications device of the terminal equipment uploads, to the monitoring platform directly or to the monitoring platform via a cinema monitoring central control, the projected content obtained through comparison and the counted number of audiences, or the projected content obtained through comparison and the counted number of audiences as well as the acquired audio and video content sample and the acquired auditorium infrared picture sample during projection; and the monitoring platform monitors the working state of the terminal equipment in real time via the communications device and the cinema monitoring central control.

Optionally, the servomechanism acquires, by using a brightness sensor, the screen brightness and brightness of a side screen material surface illuminated by projection ambient light, compares the brightness, and upon detecting that the screen brightness is significantly higher than the brightness of the screen material surface continuously or intermittently, activates the acquisition and recognition device to acquire the audio and video content and the auditorium infrared picture; or the servomechanism recognizes animation in the acquired video projected at the beginning, and upon confirming that varying images are being projected, activates the acquisition and recognition device to acquire the audio and video content and the auditorium infrared picture.

Optionally, the acquisition and recognition device stops the acquisition upon acquiring and recognizing an image or text in a "License for Public Projection of Films" of the projected film, and packages a recognition and statistical result or the acquired samples and the recognition and statistical result; the communications device of the terminal equipment uploads the package to the monitoring platform; and the monitoring platform monitors the working state of the terminal equipment in real time via the communications device; or the acquisition and recognition device stops the acquisition upon acquiring and recognizing an image or text in a "License for Public Projection of Films" of the projected film, discriminates the acquired audio and video content and the auditorium infrared picture, to recognize the projected film and count the number of audiences, or recognize the projected film and a pre-roll advertisement and count the number of audiences at the start of the film; the servomechanism continuously acquires the projected videos after the film begins to be projected, and upon recognizing end credits of the film, reactivates the acquisition and recognition device to acquire the auditorium infrared picture and recognize and count the number of audiences at the end of the film, and packages the two successive recognition and statistical results or the two successive acquired samples and recognition and statistical results; the communications device of the terminal equipment uploads the package to the monitoring platform; and the monitoring platform monitors the working state of the terminal equipment in real time via the communications device.

By comparing the numbers of movie viewers in periods at the start of the film and at the end of the film, the movie viewing atmosphere or the degree of how much the audiences like the film can be obtained. That is, if there is good atmosphere among the audiences or the audiences like the film very much, the audiences do not leave the cinema immediately when the end credits of the film appear, and the number of audiences at the end of the film is not significantly smaller than the number of audiences at the start of the film. Certainly, if the number of audiences at a time point in the middle of film projection is further acquired, and the numbers of audiences at the start of the film, in the middle of the film, and at the end of the film are further compared and analyzed, in-depth movie viewing atmosphere or an in-depth degree of how much the audiences like the film can be further obtained.

Optionally, the acquisition and recognition device acquires the projected film video or the pre-roll advertisement video and the film video, or acquires the projected film video or the pre-roll advertisement video, as well as the film video and cinema live audio by using a white light camera configured at the top of the cinema and aimed at the screen; and acquires the auditorium body infrared picture by using an infrared camera configured at the top of the cinema and aimed at the auditorium; and the acquisition and recognition device compares and discriminates the acquired videos with the monitoring database, to recognize the projected film or the projected film and the pre-roll advertisement; the acquisition and recognition device filters the acquired audio and analyzes a voice print of the audio, and compares the voice print with a voice print of a standard movie-viewing atmosphere in a cinema, to recognize a cinema ambient sound based movie-viewing atmosphere result; and the acquisition and recognition device recognizes human bodies in the acquired audience body infrared picture and statistically obtain a result of the number of audiences.

That is, the present invention provides integrated acquisition equipment in a noisy and dark overall environment of a cinema hall: 1. The acquisition equipment can simultaneously acquire dual-channel white-light/thermal imaging videos and audios, and monitor air quality. The equipment includes multiple sensors such as an acceleration sensor and a gyroscope, which can monitor an equipment loading state in real time, to find potential safety hazards and protect the equipment from man-made damage. 2. The acquisition equipment has a remote monitoring and management capability to: remotely adjust the camera angle, monitor the equipment state, adjust parameters, update firmware, and the like. After the equipment is installed, powered on, and connected to the network, it can remotely adjust the camera angle, check the equipment state, update the device driver, and the like by using specific commands. 3. A photosensitive component is adopted to implement automatic start-up and stand-by of the equipment under certain illumination. 4. A built-in power supply device is additionally added to ensure stable running of the equipment. 5. The design of the terminal equipment does not generate any electromagnetic interference or noise to the surrounding environment. 6. A rights protection mechanism is designed to protect the copyright and the like in video content acquisition.

Especially: 1. In the playing process, effective and legal image information can be extracted in real time. When the projection begins, the equipment can effectively judge on/off of the equipment according to the screen brightness, image motion, and the like, and acquire advertisements in real time; when the "License Number for Public Projection of Films" appears, white-light picture acquisition is stopped to avoid right infringement. 2. In the noisy and dark overall environment of the cinema hall, the system analyzes the acquired audio and video content, extracts a characteristic value, compares the characteristic value with related data pre-stored in the database to recognize same content, extracts and archives the content, and makes a statistical record. 3. In the noisy and dark overall environment of the cinema hall, characters and digits in the picture of the "License Number for Public Projection of Films" of the movie are automatically recognized and converted by means of OCR. An irregular picture acquired under insufficient light in the hall is restored to be a proportional standard picture by using a particular algorithm, the location of the "License Number for Public Projection of Films" is determined according to the algorithm, and the "License Number for Public Projection of Films" is recognized by means of OCR, thus recognizing the movie. 4. Audience information is acquired through infrared thermal imaging or active infrared photographing. In a completely dark environment of the cinema, the conventional camera cannot meet the requirement of human body acquisition in the dark environment, while an infrared camera can meet the requirement but cannot protect the privacy of movie viewers, and therefore, infrared thermal imaging is adopted to acquire audience information. The original image acquired by the system terminal can only be used for distinguishing human body characteristics from background characteristics, and therefore can desirably ensure the privacy of the audiences. 5. The terminal adopts a method that combines light path correction (for design sketch) and software-based image optimization to improve the image recognition rate. In the completely dark cinema environment with complex and variable light, an ordinarily acquired picture is unclear and unrecognizable due to inconsistent light, and therefore, light path correction in combination with software-based optimization is used to improve the quality of the picture, thus improving the recognition rate. 6. In the overall environment of the cinema hall, a filter lens capable of filtering visible light is adopted to eliminate interference of constantly changing ambient light on the image acquisition effect. During projection in the cinema, the quality of the acquired picture is affected by not only visible light but also invisible light, and therefore, the filter lens for removing visible light is added to eliminate influences of constantly changing ambient light on the image acquisition effect. 7. In the overall environment of the cinema hall, an audio acquisition module of the terminal equipment is provided with an anti-interference and noise reduction design. In the cinema hall, there are not only sounds produced by the movie being shown, but also voices of talking, sounds of telephone rings, and the like. Therefore, the terminal equipment is provided with a design for reducing noises and improving the audio recognition rate. 8. The acquired image and automatic statistical data are saved and uploaded in a timeline order. At present, the box office and the number of viewers of a movie on show are not particularly accurate; there exists phenomena such as buying a ticket but not watching the movie, and thus the historical number of movie viewers and basis cannot be checked. Therefore, the equipment uploads the acquired picture information in a timeline order for saving, so as to provide powerful evidence for subsequent checks.

After adopting the foregoing technical solution, the integrated solution method and system for monitoring cinema content and conducting movie-viewing statistics according to the present invention have the advantages of low costs in monitoring and statistics as well as high reliability.

DETAILED DESCRIPTION

An integrated solution method for monitoring cinema content and conducting movie-viewing statistics according to the present invention includes: acquiring, by use of a servomechanism of terminal equipment configured in a cinema, screen brightness and projection ambient brightness or a video projected at the beginning, comparing the acquired screen brightness and the projection ambient brightness or discriminating the video projected at the beginning, and activating, after it is determined that a film begins to be projected, an acquisition and recognition device of the terminal equipment to acquire the played audio and video content and acquire an auditorium infrared picture during projection; comparing, by the acquisition and recognition device, the acquired audio and video content with a monitoring database to obtain the projected content, recognizing, by the acquisition and recognition device, human bodies in the acquired auditorium infrared picture during projection to count the number of audiences, and associating or combining, by the acquisition and recognition device, the projected content obtained through comparison with the counted number of audiences; uploading, by a communications device of the terminal equipment, the projected content obtained through comparison and the counted number of audiences to a monitoring platform; and monitoring, by the monitoring platform, a working state of the terminal equipment in real time via the communications device.

Specifically, the acquisition and recognition device associates or combines the projected content obtained through comparison and the counted number of audiences with the acquired audio and video content sample and the acquired auditorium infrared picture sample during projection; the communications device of the terminal equipment uploads, to the monitoring platform directly or to the monitoring platform via a cinema monitoring central control, the projected content obtained through comparison and the counted number of audiences, or the projected content obtained through comparison and the counted number of audiences as well as the acquired audio and video content sample and the acquired auditorium infrared picture sample during projection; and the monitoring platform monitors the working state of the terminal equipment in real time via the communications device and the cinema monitoring central control.

Specifically, the servomechanism acquires, by using a brightness sensor, the screen brightness and brightness of a side screen material surface illuminated by projection ambient light, compares the brightness, and upon detecting that the screen brightness is significantly higher than the brightness of the screen material surface continuously or intermittently, activates the acquisition and recognition device to acquire the audio and video content and the auditorium infrared picture; or the servomechanism recognizes animation in the acquired video projected at the beginning, and upon confirming that varying images are being projected, activates the acquisition and recognition device to acquire the audio and video content and the auditorium infrared picture.

More specifically, the acquisition and recognition device stops the acquisition upon acquiring and recognizing an image or text in a "License for Public Projection of Films" of the projected film, and packages a recognition and statistical result or the acquired samples and the recognition and statistical result; the communications device of the terminal equipment uploads the package to the monitoring platform; and the monitoring platform monitors the working state of the terminal equipment in real time via the communications device; or the acquisition and recognition device stops the acquisition upon acquiring and recognizing an image or text in a "License for Public Projection of Films" of the projected film, discriminates the acquired audio and video content and the auditorium infrared picture, to recognize the projected film and count the number of audiences, or recognize the projected film and a pre-roll advertisement and count the number of audiences at the start of the film; the servomechanism continuously acquires the projected videos after the film begins to be projected, and upon recognizing end credits of the film, reactivates the acquisition and recognition device to acquire the auditorium infrared picture and recognize and count the number of audiences at the end of the film, and packages the two successive recognition and statistical results or the two successive acquired samples and recognition and statistical results; the communications device of the terminal equipment uploads the package to the monitoring platform; and the monitoring platform monitors the working state of the terminal equipment in real time via the communications device.

By comparing the numbers of movie viewers in periods at the start of the film and at the end of the film, the movie viewing atmosphere or the degree of how much the audiences like the film can be obtained. That is, if there is good atmosphere among the audiences or the audiences like the film very much, the audiences do not leave the cinema immediately when the end credits of the film appear, and the number of audiences at the end of the film is not significantly smaller than the number of audiences at the start of the film. Certainly, if the number of audiences at a time point in the middle of film projection is further acquired, and the numbers of audiences at the start of the film, in the middle of the film, and at the end of the film are further compared and analyzed, in-depth movie viewing atmosphere or an in-depth degree of how much the audiences like the film can be further obtained.

Preferably, the acquisition and recognition device acquires the projected film video or the pre-roll advertisement video and the film video, or acquires the projected film video or the pre-roll advertisement video, as well as the film video and cinema live audio by using a white light camera aimed at the screen; and acquires the auditorium body infrared picture by using an infrared camera aimed at the auditorium; and the acquisition and recognition device compares and discriminates the acquired videos with the monitoring database, to recognize the projected film or the projected film and the pre-roll advertisement; the acquisition and recognition device filters the acquired audio and analyzes a voice print of the audio, and compares the voice print with a voice print of a standard movie-viewing atmosphere in a cinema, to recognize a cinema ambient sound based movie-viewing atmosphere result; and the acquisition and recognition device recognizes human bodies in the acquired audience body infrared picture and statistically obtain a result of the number of audiences.

Figure 1:
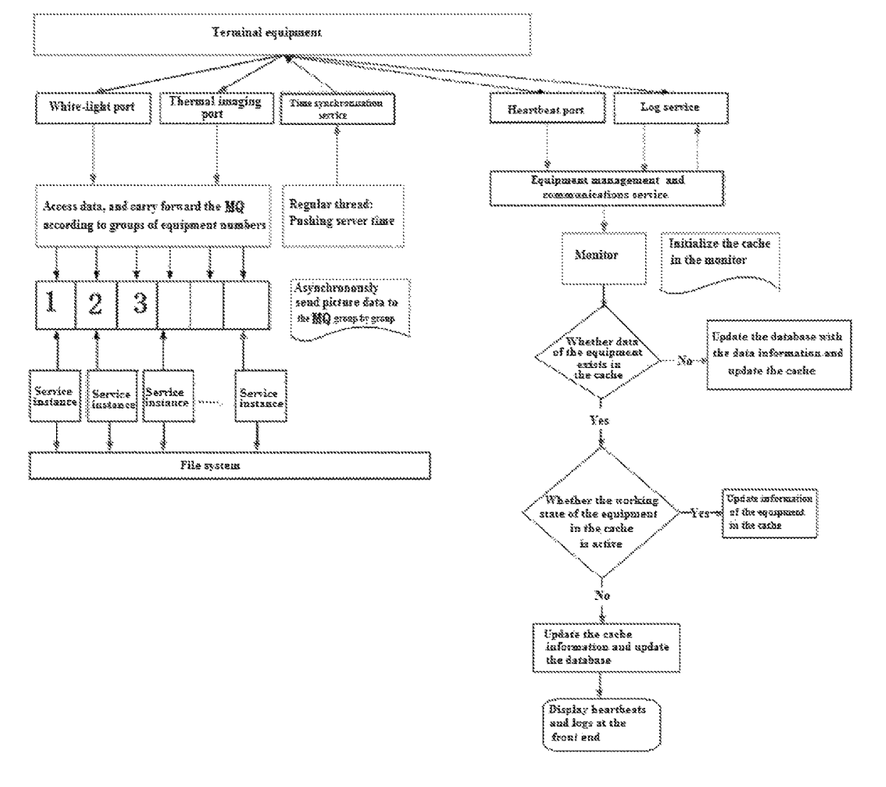
FIG. 1 is a schematic block diagram of principles of an integrated solution method and system for monitoring cinema content and conducting movie-viewing statistics according to the present invention.

As shown in the FIGURE, the present invention provides integrated acquisition equipment in a noisy and dark overall environment of a cinema hall: 1. The acquisition equipment can simultaneously acquire dual-channel white-light/thermal imaging videos and audios, and monitor air quality. The equipment includes multiple sensors such as an acceleration sensor and a gyroscope, which can monitor an equipment loading state in real time, to find potential safety hazards and protect the equipment from man-made damage. 2. The acquisition equipment has a remote monitoring and management capability to: remotely adjust the camera angle, monitor the equipment state, adjust parameters, update firmware, and the like. After the equipment is installed, powered on, and connected to the network, it can remotely adjust the camera angle, check the equipment state, update the device driver, and the like by using specific commands. 3. A photosensitive component is adopted to implement automatic start-up and stand-by of the equipment under certain illumination. 4. A built-in power supply device is additionally added to ensure stable running of the equipment. 5. The design of the terminal equipment does not generate any electromagnetic interference or noise to the surrounding environment. 6. A rights protection mechanism is designed to protect the copyright and the like in video content acquisition.

Especially: 1. In the playing process, effective and legal image information can be extracted in real time. When the projection begins, the equipment can effectively judge on/off of the equipment according to the screen brightness, image motion, and the like, and acquire advertisements in real time; when the "License Number for Public Projection of Films" appears, white-light picture acquisition is stopped to avoid right infringement. 2. In the noisy and dark overall environment of the cinema hall, the system analyzes the acquired audio and video content, extracts a characteristic value, compares the characteristic value with related data pre-stored in the database to recognize same content, extracts and archives the content, and makes a statistical record. 3. In the noisy and dark overall environment of the cinema hall, characters and digits in the picture of the "License Number for Public Projection of Films" of the movie are automatically recognized and converted by means of OCR. An irregular picture acquired under insufficient light in the hall is restored to be a proportional standard picture by using a particular algorithm, the location of the "License Number for Public Projection of Films" is determined according to the algorithm, and the "License Number for Public Projection of Films" is recognized by means of OCR, thus recognizing the movie. 4. Audience information is acquired through infrared thermal imaging or active infrared photographing. In a completely dark environment of the cinema, the conventional camera cannot meet the requirement of human body acquisition in the dark environment, while an infrared camera can meet the requirement but cannot protect the privacy of movie viewers, and therefore, infrared thermal imaging is adopted to acquire audience information. The original image acquired by the system terminal can only be used for distinguishing human body characteristics from background characteristics, and therefore can desirably ensure the privacy of the audiences. 5. The terminal adopts a method that combines light path correction (for design sketch) and software-based image optimization to improve the image recognition rate. In the completely dark cinema environment with complex and variable light, an ordinarily acquired picture is unclear and unrecognizable due to inconsistent light, and therefore, light path correction in combination with software-based optimization is used to improve the quality of the picture, thus improving the recognition rate. 6. In the overall environment of the cinema hall, a filter lens capable of filtering visible light is adopted to eliminate interference of constantly changing ambient light on the image acquisition effect. During projection in the cinema, the quality of the acquired picture is affected by not only visible light but also invisible light, and therefore, the filter lens for removing visible light is added to eliminate influences of constantly changing ambient light on the image acquisition effect. 7. In the overall environment of the cinema hall, an audio acquisition module of the terminal equipment is provided with an anti-interference and noise reduction design. In the cinema hall, there are not only sounds produced by the movie being shown, but also voices of talking, sounds of telephone rings, and the like. Therefore, the terminal equipment is provided with a design for reducing noises and improving the audio recognition rate. 8. The acquired image and automatic statistical data are saved and uploaded in a timeline order. At present, the box office and the number of viewers of a movie on show are not particularly accurate; there exists phenomena such as buying a ticket but not watching the movie, and thus the historical number of movie viewers and basis cannot be checked. Therefore, the equipment uploads the acquired picture information in a timeline order for saving, so as to provide powerful evidence for subsequent checks.

The method of the present invention desirably solves the problems with data statistics such as the cinema content monitoring, box office, and the real-time number of movie viewers, thus providing accurate and valid evidence for "box office stealing/missing", avoiding sparse sampling as well as missing and errors of statistics in manual monitoring, reducing costs of data statistics, and improving the data accuracy. That is, after adopting the above technical solution, the integrated solution method for monitoring cinema content and conducting movie-viewing statistics according to the present invention has the advantages of low costs in monitoring and statistics as well as high reliability.

In a system for implementing the method of the present invention, a servomechanism of terminal equipment configured in a cinema acquires screen brightness and projection ambient brightness or a video projected at the beginning, compares the acquired screen brightness and the projection ambient brightness or discriminates the video projected at the beginning, and activates, after it is determined that a film begins to be projected, an acquisition and recognition device of the terminal equipment to acquire the played audio and video content and acquire an auditorium infrared picture during projection; the acquisition and recognition device compares the acquired audio and video content with a monitoring database to obtain the projected content, and the acquisition and recognition device recognizes human bodies in the acquired auditorium infrared picture during projection to count the number of audiences, and associates or combines the projected content obtained through comparison with the counted number of audiences; then a communications device of the terminal equipment uploads the projected content obtained through comparison and the counted number of audiences to a monitoring platform; and the monitoring platform monitors a working state of the terminal equipment in real time via the communications device.

Specifically, the acquisition and recognition device associates or combines the projected content obtained through comparison and the counted number of audiences with the acquired audio and video content sample and the acquired auditorium infrared picture sample during projection; the communications device of the terminal equipment uploads, to the monitoring platform directly or to the monitoring platform via a cinema monitoring central control, the projected content obtained through comparison and the counted number of audiences, or the projected content obtained through comparison and the counted number of audiences as well as the acquired audio and video content sample and the acquired auditorium infrared picture sample during projection; and the monitoring platform monitors the working state of the terminal equipment in real time via the communications device and the cinema monitoring central control.

Specifically, the servomechanism acquires, by using a brightness sensor, the screen brightness and brightness of a side screen material surface illuminated by projection ambient light, compares the brightness, and upon detecting that the screen brightness is significantly higher than the brightness of the screen material surface continuously or intermittently, activates the acquisition and recognition device to acquire the audio and video content and the auditorium infrared picture; or the servomechanism recognizes animation in the acquired video projected at the beginning, and upon confirming that varying images are being projected, activates the acquisition and recognition device to acquire the audio and video content and the auditorium infrared picture.

More specifically, the acquisition and recognition device stops the acquisition upon acquiring and recognizing an image or text in a "License for Public Projection of Films" of the projected film, and packages a recognition and statistical result or the acquired samples and the recognition and statistical result; the communications device of the terminal equipment uploads the package to the monitoring platform; and the monitoring platform monitors the working state of the terminal equipment in real time via the communications device; or the acquisition and recognition device stops the acquisition upon acquiring and recognizing an image or text in a "License for Public Projection of Films" of the projected film, discriminates the acquired audio and video content and the auditorium infrared picture, to recognize the projected film and count the number of audiences, or recognize the projected film and a pre-roll advertisement and count the number of audiences at the start of the film; the servomechanism continuously acquires the projected videos after the film begins to be projected, and upon recognizing end credits of the film, reactivates the acquisition and recognition device to acquire the auditorium infrared picture and recognize and count the number of audiences at the end of the film, and packages the two successive recognition and statistical results or the two successive acquired samples and recognition and statistical results; the communications device of the terminal equipment uploads the package to the monitoring platform; and the monitoring platform monitors the working state of the terminal equipment in real time via the communications device.

By comparing the numbers of movie viewers in periods at the start of the film and at the end of the film, the movie viewing atmosphere or the degree of how much the audiences like the film can be obtained. That is, if there is good atmosphere among the audiences or the audiences like the film very much, the audiences do not leave the cinema immediately when the end credits of the film appear, and the number of audiences at the end of the film is not significantly smaller than the number of audiences at the start of the film. Certainly, if the number of audiences at a time point in the middle of film projection is further acquired, and the numbers of audiences at the start of the film, in the middle of the film, and at the end of the film are further compared and analyzed, in-depth movie viewing atmosphere or an in-depth degree of how much the audiences like the film can be further obtained.

Preferably, the acquisition and recognition device acquires the projected film video or the pre-roll advertisement video and the film video, or acquires the projected film video or the pre-roll advertisement video, as well as the film video and cinema live audio by using a white light camera configured at the top of the cinema and aimed at the screen; and acquires the auditorium body infrared picture by using an infrared camera configured at the top of the cinema and aimed at the auditorium; and the acquisition and recognition device compares and discriminates the acquired videos with the monitoring database, to recognize the projected film or the projected film and the pre-roll advertisement; the acquisition and recognition device filters the acquired audio and analyzes a voice print of the audio, and compares the voice print with a voice print of a standard movie-viewing atmosphere in a cinema, to recognize a cinema ambient sound based movie-viewing atmosphere result; and the acquisition and recognition device recognizes human bodies in the acquired audience body infrared picture and statistically obtain a result of the number of audiences.

As shown in the FIGURE, the present invention provides integrated acquisition equipment in a noisy and dark overall environment of a cinema hall: 1. The acquisition equipment can simultaneously acquire dual-channel white-light/thermal imaging videos and audios, and monitor air quality. The equipment includes multiple sensors such as an acceleration sensor and a gyroscope, which can monitor an equipment loading state in real time, to find potential safety hazards and protect the equipment from man-made damage. 2. The acquisition equipment has a remote monitoring and management capability to: remotely adjust the camera angle, monitor the equipment state, adjust parameters, update firmware, and the like. After the equipment is installed, powered on, and connected to the network, it can remotely adjust the camera angle, check the equipment state, update the device driver, and the like by using specific commands. 3. A photosensitive component is adopted to implement automatic start-up and stand-by of the equipment under certain illumination. 4. A built-in power supply device is additionally added to ensure stable running of the equipment. 5. The design of the terminal equipment does not generate any electromagnetic interference or noise to the surrounding environment. 6. A rights protection mechanism is designed to protect the copyright and the like in video content acquisition.

Especially: 1. In the playing process, effective and legal image information can be extracted in real time. When the projection begins, the equipment can effectively judge on/off of the equipment according to the screen brightness, image motion, and the like, and acquire advertisements in real time; when the "License Number for Public Projection of Films" appears, white-light picture acquisition is stopped to avoid right infringement. 2. In the noisy and dark overall environment of the cinema hall, the system analyzes the acquired audio and video content, extracts a characteristic value, compares the characteristic value with related data pre-stored in the database to recognize same content, extracts and archives the content, and makes a statistical record. 3. In the noisy and dark overall environment of the cinema hall, characters and digits in the picture of the "License Number for Public Projection of Films" of the movie are automatically recognized and converted by means of OCR. An irregular picture acquired under insufficient light in the hall is restored to be a proportional standard picture by using a particular algorithm, the location of the "License Number for Public Projection of Films" is determined according to the algorithm, and the "License Number for Public Projection of Films" is recognized by means of OCR, thus recognizing the movie. 4. Audience information is acquired through infrared thermal imaging or active infrared photographing. In a completely dark environment of the cinema, the conventional camera cannot meet the requirement of human body acquisition in the dark environment, while an infrared camera can meet the requirement but cannot protect the privacy of movie viewers, and therefore, infrared thermal imaging is adopted to acquire audience information. The original image acquired by the system terminal can only be used for distinguishing human body characteristics from background characteristics, and therefore can desirably ensure the privacy of the audiences. 5. The terminal adopts a method that combines light path correction (for design sketch) and software-based image optimization to improve the image recognition rate. In the completely dark cinema environment with complex and variable light, an ordinarily acquired picture is unclear and unrecognizable due to inconsistent light, and therefore, light path correction in combination with software-based optimization is used to improve the quality of the picture, thus improving the recognition rate. 6. In the overall environment of the cinema hall, a filter lens capable of filtering visible light is adopted to eliminate interference of constantly changing ambient light on the image acquisition effect. During projection in the cinema, the quality of the acquired picture is affected by not only visible light but also invisible light, and therefore, the filter lens for removing visible light is added to eliminate influences of constantly changing ambient light on the image acquisition effect. 7. In the overall environment of the cinema hall, an audio acquisition module of the terminal equipment is provided with an anti-interference and noise reduction design. In the cinema hall, there are not only sounds produced by the movie being shown, but also voices of talking, sounds of telephone rings, and the like. Therefore, the terminal equipment is provided with a design for reducing noises and improving the audio recognition rate. 8. The acquired image and automatic statistical data are saved and uploaded in a timeline order. At present, the box office and the number of viewers of a movie on show are not particularly accurate; there exists phenomena such as buying a ticket but not watching the movie, and thus the historical number of movie viewers and basis cannot be checked. Therefore, the equipment uploads the acquired picture information in a timeline order for saving, so as to provide powerful evidence for subsequent checks.

The system of the present invention desirably solves the problems with data statistics such as the cinema content monitoring, box office, and the real-time number of movie viewers, thus providing accurate and valid evidence for "box office stealing/missing", avoiding sparse sampling as well as missing and errors of statistics in manual monitoring, reducing costs of data statistics, and improving the data accuracy. That is, after adopting the above technical solution, the system according to the present invention has the advantages of low costs in monitoring and statistics as well as high reliability.

The invention claimed is:

1. A method, comprising:
   acquiring, by use of a servomechanism of terminal equipment configured in a cinema auditorium, screen brightness and brightness of a side screen material surface illuminated by projection ambient brightness in the cinema auditorium;
   comparing the acquired screen brightness to the brightness of the side screen material surface to determine if projection of a film has started;
   activating, after it is determined that the projection of the film has started, an acquisition and recognition device of the terminal equipment to acquire an auditorium infrared picture during projection;
   recognizing, by the acquisition and recognition device, human bodies in the acquired auditorium infrared picture during projection to count the number of persons in the cinema auditorium; and
   uploading, by a communications device of the terminal equipment, the counted number of persons to a monitoring platform.

2. The method according to claim 1, wherein the acquisition and recognition device acquires the audio and video content sample of the film by using a white light camera aimed at a screen; and acquires the auditorium infrared picture by using an infrared camera aimed at the cinema auditorium; and
   wherein the acquisition and recognition device compares the acquired audio and video sample with the monitoring database, to identify the content of the film being projected; the acquisition and recognition device filters acquired audio and analyzes a voice print of the acquired audio, and compares the voice print with a voice print of a standard movie-viewing atmosphere in a cinema, to recognize a cinema ambient sound based movie-viewing atmosphere result; and the acquisition and recognition device recognizes human bodies present in the acquired audience infrared picture and statistically obtains a result of the number of persons.

3. The method according to claim 1, wherein the activating the acquisition and recognition device of the terminal equipment is further to acquire an audio and video content sample of the film, and wherein the method further comprises:
   comparing, by the acquisition and recognition device, the acquired audio and video content sample with a monitoring database to identify the content of the film being projected; and
   associating, by the acquisition and recognition device, the identified content with the counted number of persons,
   wherein the uploading of the counted number of persons comprises uploading the associated identified content with the counted number of persons.

4. The method according to claim 3, wherein the acquisition and recognition device associates the identified content and the counted number of persons with the acquired audio and video content sample and the acquired auditorium infrared picture;
   wherein the communications device of the terminal equipment uploads, to the monitoring platform the counted number of persons, the acquired audio and video content sample, and the acquired auditorium infrared picture; and wherein the monitoring platform monitors a working state of the terminal equipment in real time via the communications device and a cinema monitoring central control.

5. The method according to claim 3, wherein the servomechanism acquires, by using a brightness sensor, the screen brightness and a brightness of a side screen material surface illuminated by the projection ambient brightness, compares the screen brightness and the brightness of the side screen material surface, and upon detecting that the screen brightness is significantly higher than the brightness of the side screen material surface, activates the acquisition and recognition device.

6. The method according to claim 5, wherein the acquisition and recognition device stops acquiring upon recognizing a predetermined point in the film, and packages at least one of a recognition and statistical result, the acquired audio and video content sample, and the acquired auditorium infrared picture;
wherein the communications device of the terminal equipment uploads the package to the monitoring platform; and
wherein the monitoring platform monitors a working state of the terminal equipment in real time via the communications device.

7. The method according to claim 5, wherein the acquisition and recognition device stops acquiring upon recognizing a predetermined point in the film, compares the acquired audio and video content sample with the monitoring database to identify the content, and recognizes human bodies to count the number of persons,
wherein the servomechanism, upon end credits of the film, reactivates the acquisition and recognition device to acquire the auditorium infrared picture and recognize to count the number of persons present at an end of the film, and packages at least one of two recognition and statistical results, two acquired audio and video content samples, and two acquired auditorium infrared pictures;
wherein the communications device of the terminal equipment uploads the packages to the monitoring platform; and
wherein the monitoring platform monitors a working state of the terminal equipment in real time via the communications device.

8. The method according to claim 1 monitoring, by the monitoring platform, a working state of the terminal equipment in real time via the communications device.

9. The method according to claim 1, wherein the servomechanism recognizes animation in an acquired video, and upon confirming that varying images are being projected, activates the acquisition and recognition device.

10. A system, comprising:
terminal equipment in a cinema auditorium,
a servomechanism of the terminal equipment in the cinema auditorium configured to acquire screen brightness and brightness of a side screen material surface illuminated by projection ambient brightness in the cinema auditorium;
wherein the terminal equipment is configured to compare the acquired screen brightness to the brightness of the side screen material surface to determine if projection of a film has started;
wherein the terminal equipment is configured to activate, after it is determined that the projection of the film has started, an acquisition and recognition device of the terminal equipment to acquire an auditorium infrared picture during projection;
wherein the acquisition and recognition device is configured to recognize human bodies in the acquired auditorium infrared picture during projection to count the number of persons in the cinema auditorium; and
a communications device of the terminal equipment configured to upload the counted number of audiences persons to a monitoring platform.

11. The system according to claim 10, wherein the acquisition and recognition device acquires the audio and video content sample of the film by using a white light camera configured at the top of the cinema and aimed at a screen; and acquires the auditorium infrared picture by using an infrared camera configured at the top of the cinema auditorium and aimed at the cinema auditorium; and
wherein the acquisition and recognition device compares the acquired audio and video sample with the monitoring database, to identify the content of the film being projected; the acquisition and recognition device filters acquired audio and analyzes a voice print of the acquired audio, and compares the voice print with a voice print of a standard movie-viewing atmosphere in a cinema, to recognize a cinema ambient sound based movie-viewing atmosphere result; and the acquisition and recognition device recognizes human bodies present in the acquired audience infrared picture and statistically obtains a result of the number of persons.

12. The system according to claim 10, wherein the acquisition and recognition device is further configured to acquire an audio and video content sample of the film, and wherein the system further comprises,
wherein the acquisition and recognition device is further configured to compare the acquired audio and video content sample with a monitoring database to identify the content of the film being projected,
wherein the acquisition and recognition device is configured to associate the identified content with the counted number of persons, and
wherein the uploading of the counted number of persons comprises uploading the associated identified content with the counted number of persons.

13. The system according to claim 12, wherein the acquisition and recognition device associates the identified content and the counted number of persons with the acquired audio and video content sample and the acquired auditorium infrared picture;
wherein the communications device of the terminal equipment uploads, to the monitoring platform the projected identified content, the counted number of persons, the acquired audio and video content sample, and the acquired auditorium infrared picture; and
wherein the monitoring platform monitors a working state of the terminal equipment in real time via the communications device and a cinema monitoring central control.

14. The system according to claim 12, wherein the servomechanism acquires, by using a brightness sensor, the screen brightness and a brightness of a side screen material surface illuminated by the projection ambient brightness, compares the screen brightness and the brightness of the side screen material surface, and upon detecting that the screen brightness is significantly higher than the brightness of the side screen material surface, activates the acquisition and recognition device.

15. The system according to claim 14, wherein the acquisition and recognition device stops acquiring upon recognizing a predetermined point in the film, and packages at least one of a recognition and statistical result, the acquired audio and video content sample, and the acquired auditorium infrared picture;
  wherein the communications device of the terminal equipment uploads the package to the monitoring platform; and
  wherein the monitoring platform monitors a working state of the terminal equipment in real time via the communications device.

16. The system according to claim 14, wherein the acquisition and recognition device stops acquiring upon recognizing a predetermined point in the film, compares the acquired audio and video content sample with the monitoring database to identify the content, and recognizes human bodies to count the number of persons,
  wherein the servomechanism, upon end credits of the film, reactivates the acquisition and recognition device to acquire the auditorium infrared picture and recognize to count the number of persons present at an end of the film, and packages at least one of two recognition and statistical results, two acquired audio and video content samples, and two acquired auditorium infrared pictures;
  wherein the communications device of the terminal equipment uploads the packages to the monitoring platform; and
  wherein the monitoring platform monitors a working state of the terminal equipment in real time via the communications device.

17. The system according to claim 10 monitoring, by the monitoring platform, a working state of the terminal equipment in real time via the communications device.

18. The system according to claim 10, wherein the servomechanism recognizes animation in an acquired video, and upon confirming that varying images are being projected, activates the acquisition and recognition device.

19. A method, comprising:
  acquiring, in a cinema auditorium, screen brightness and brightness of a side screen material surface illuminated by projection ambient brightness in the cinema auditorium;
  comparing the acquired screen brightness to the brightness of the side screen material to determine if projection of a film has started;
  after it is determined that the projection of the film has started, acquiring an auditorium infrared picture during projection;
  recognizing, by a recognition device, human bodies in the acquired auditorium infrared picture during projection to count the number of persons in the cinema auditorium; and
uploading, by a communications device, the counted number of persons for monitoring.

20. The method of claim 19, further comprising:
  acquiring an audio and video content sample of the film;
  comparing the acquired audio and video content sample with a monitoring database to identify the content of the film being projected; and
  associating the identified content with the counted number of persons.

21. The method according to claim 20, further comprising:
  associating the identified content and the counted number of persons with the acquired audio and video content sample and the acquired auditorium infrared picture.

22. The method according to claim 20, wherein the screen brightness and a brightness of a side screen material surface illuminated by the projection ambient brightness is acquired using a brightness sensor.

* * * * *

UNITED STATES PATENT AND TRADEMARK OFFICE
CERTIFICATE OF CORRECTION

| | |
|---|---|
| PATENT NO. | : 10,085,060 B2 |
| APPLICATION NO. | : 15/260443 |
| DATED | : September 25, 2018 |
| INVENTOR(S) | : PangZe |

Page 1 of 1

It is certified that error appears in the above-identified patent and that said Letters Patent is hereby corrected as shown below:

In the Claims

In Column 14, Lines 64-65, in Claim 4, delete "monitoring platform the counted number of persons," and insert -- monitoring platform, the identified content, the counted number of persons, --, therefor.

In Column 15, Line 56, in Claim 10, delete "auditorium," and insert -- auditorium; --, therefor.

In Column 16, Lines 9-10, in Claim 10, delete "audiences persons" and insert -- persons --, therefor.

In Column 16, Lines 51-52, in Claim 13, delete "monitoring platform the projected identified content," and insert -- monitoring platform, the identified content, --, therefor.

Signed and Sealed this
Eleventh Day of December, 2018

Andrei Iancu
*Director of the United States Patent and Trademark Office*